United States Patent
Hu et al.

(10) Patent No.: US 7,538,801 B2
(45) Date of Patent: May 26, 2009

(54) REGION-BASED AUTO GAIN CONTROL AND AUTO EXPOSURE CONTROL METHOD AND APPARATUS

(75) Inventors: Shane Ching-Feng Hu, Fremont, CA (US); Atif Sarwari, Saratoga, CA (US)

(73) Assignee: Micron Technology, Inc., Boise, IA (US)

(*) Notice: Subject to any disclaimer, the term of this patent is extended or adjusted under 35 U.S.C. 154(b) by 1309 days.

(21) Appl. No.: 10/661,551

(22) Filed: Sep. 15, 2003

(65) Prior Publication Data

US 2005/0057666 A1 Mar. 17, 2005

(51) Int. Cl.
*H04N 5/235* (2006.01)
*G06K 9/00* (2006.01)

(52) U.S. Cl. .................. 348/229.1; 348/221.1; 348/362; 382/168

(58) Field of Classification Search .................. 348/255, 348/229.1, 221.1, 230.1, 364, 361, 362, 363, 348/365, 366; 382/168, 171, 172
See application file for complete search history.

(56) References Cited

U.S. PATENT DOCUMENTS 5,784,099 A * 7/1998 Lippincott ............... 348/222.1
5,799,106 A 8/1998 Mooney et al.
7,173,663 B2 * 2/2007 Skow et al. .................. 348/364
2002/0080247 A1 * 6/2002 Takahashi et al. ........... 348/229

OTHER PUBLICATIONS

J. Lubin et al.—"Robust, Content-Dependent, High-Fidelity Watermark for Tracking in Digital Cinema," in *Security and Watermarking of Multimedia Contents V*, Edward J. Delp III, Ping Wah Wong, Editors, Proceedings of SPIE vol. 5020 (2003) 10 pages.
N. McCaffrey "CMOS Active Pixel Sensors with Extended Dynamic Range," Vision Show 2000 Sarnoff Corporation, Mar. 17, 2000, 21 pages.

* cited by examiner

*Primary Examiner*—Tuan V Ho
*Assistant Examiner*—Selam T Gebriel
(74) *Attorney, Agent, or Firm*—Dickstein Shapiro LLP (57) ABSTRACT

An apparatus and method for performing automatic exposure and gain control while minimizing oscillations as well as providing a good response time, for example, a lag time or a settling time of about one frame. The automatic exposure and gain controls are performed not only on the image as a whole but on a weighted region of interest. If the contrast in the image exceeds the dynamic range of the sensor array, then the image in the region of interest will improve at the expense of the remainder of the image. A region of interest is a selected subset of tiles upon which automatic exposure and gain control will be based. The tiles are defined by a grid system having grid coordinates, which are programmable. Image sensors have to receive feedback with regular updates of exposure and gain settings based on ever changing light conditions.

23 Claims, 11 Drawing Sheets

REGION-BASED AUTO GAIN CONTROL AND AUTO EXPOSURE CONTROL METHOD AND APPARATUS

FIELD OF THE INVENTION

The invention relates generally to automatic adjustment of exposure and gain, and in particular to a highly flexible region-based approach to automatic adjustment of exposure and gain for image sensors.

BACKGROUND OF THE INVENTION

CMOS imagers are low cost imaging devices. A fully compatible CMOS sensor technology enabling a higher level of integration of an image array with associated processing circuits would be beneficial to many digital applications such as, for example, in cameras, scanners, machine vision systems, vehicle navigation systems, video telephones, computer input devices, surveillance systems, auto focus systems, star trackers, motion detection systems, image stabilization systems and data compression systems for high-definition television.

CMOS imagers have a low voltage operation and low power consumption; CMOS imagers are compatible with integrated on-chip electronics (control logic and timing, image processing, and signal conditioning such as A/D conversion); CMOS imagers allow random access to the image data; and CMOS imagers have lower fabrication costs as compared with, for example, the conventional CCD since standard CMOS processing techniques can be used. Additionally, low power consumption is achieved for CMOS imagers because only one row of pixels at a time needs to be active during the readout and there is no charge transfer (and associated switching) from pixel to pixel during image acquisition. On-chip integration of electronics is particularly advantageous because of the potential to perform many signal conditioning functions in the digital domain (versus analog signal processing) as well as to achieve a reduction in system size and cost.

In order to maintain the quality and brightness of an image at an optimal level, the exposure and gain settings have to be continually adjusted for varying light conditions. Exposure is the duration for which the pixel sensor is capturing photons and accumulating induced electrons. Gain is the amount of analog amplification or attenuation that a pixel sensor signal undergoes. Amplification is where the gain is greater than one and attenuation is where the gain is less than one.

By varying the exposure and the gain of a pixel sensor, optimal images can be obtained from a sensor. For example, for the bright light conditions of a beach on a sunny day, the exposure would be set to a minimum and the gain to less than or equal to one. Similarly, if the image desired to be captured is a polar bear in a snow storm, the exposure would be set to a minimum and the gain to less than or equal to one. For dark conditions such as when trying to capture an image of a deer at night, the exposure would be set to a maximum and the gain to greater than or equal to one. Automatic exposure and gain control algorithms, however, carry the risk of oscillations. If the desired exposure and gain and the actual exposure and gain do not converge, then oscillations result, which adversely impact the captured image.

BRIEF SUMMARY OF THE INVENTION

The apparatus and method of the present invention performs automatic exposure and gain control while minimizing oscillations as well as providing a good response time, for example, a lag time or a settling time of about one frame. The automatic exposure and gain controls are performed not only on the image as a whole but on a weighted region of interest. If the contrast in the image exceeds the dynamic range of the sensor array, then the image in the region of interest will improve at the expense of the remainder of the image. A region of interest is a selected subset of tiles upon which automatic exposure and gain control will be based. The tiles are defined by a grid system having grid coordinates, which are programmable.

Image sensors have to receive feedback with regular updates of exposure and gain settings based on ever changing light conditions. Concentrating on a region of interest ensures that the object of interest (the target of the photo) is correctly exposed. Therefore, if the object of interest becomes backlit or shaded then the region of interest can be defined such that the object of interest is correctly exposed even at the expense of the remainder of the image.

BRIEF DESCRIPTION OF THE DRAWINGS

Other features and advantages of the present invention will become apparent when the following description is read in conjunction with the accompanying drawings, in which.

DETAILED DESCRIPTION OF THE INVENTION

Figure 1:
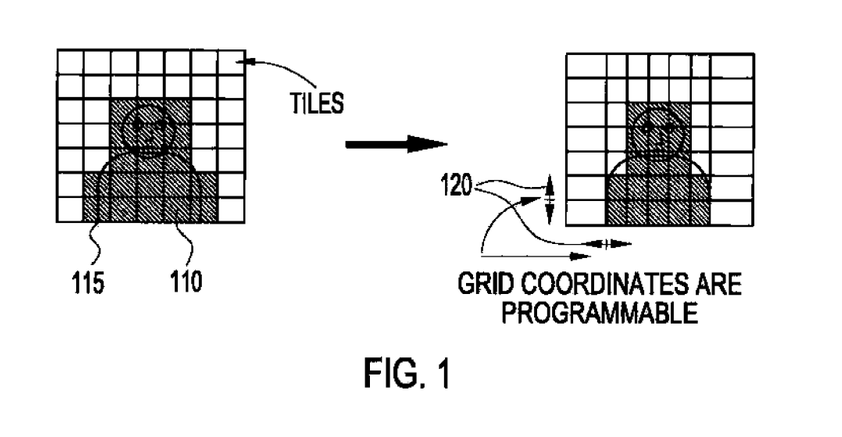
FIG. 1 shows a selection of tiles based on an object of interest in a region of interest.

FIG. 1 shows a selection of tiles based on an object of interest 110 in a region of interest 115 (shaded tiles). Initially, the tiles 105 are defined by dividing the image field into tiles of equal size as illustrated in the tiles of the image field on the left of FIG. 1. Once a region of interest 115 has been identified based on the selection of an object of interest 110, the size of the tiles can be adjusted by adjusting the grid coordinates 120 of the tiles as illustrated in the tiles of the image field on the right of FIG. 1. The tiles of the region of interest 115 (shaded tiles) have been made smaller and the tiles outside of the region of interest 115 have been made larger.

Figure 2:
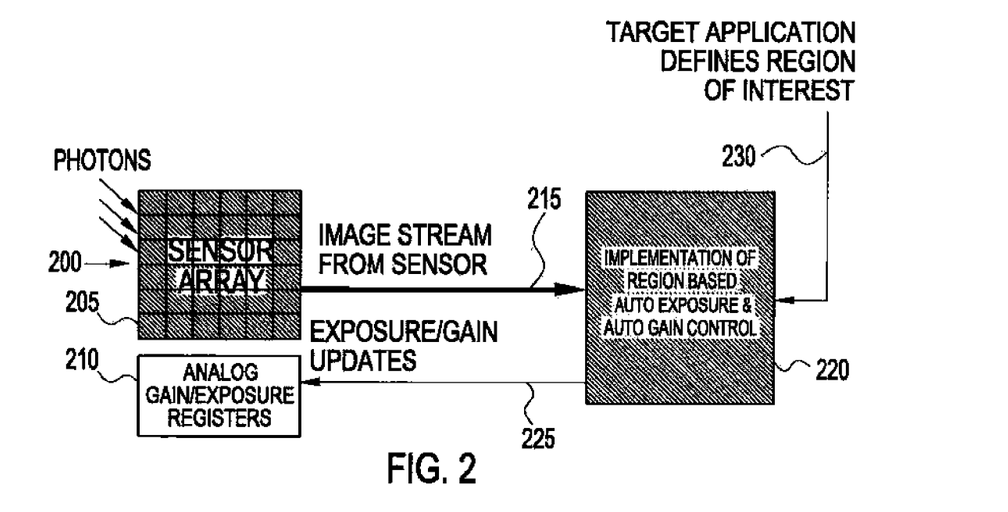
FIG. 2 is a block diagram of an auto-control feedback loop.

FIG. 2 is a block diagram of an auto-control feedback loop 200. The sensor array 205 has pixels, which accumulate charge based on an exposure to light. Analog exposure and gain registers 210 control the exposure and gain of the sensor array 205. An image stream 215 from the sensor array 205 is applied to the region-based automatic exposure and gain control circuit 220. The analog exposure and gain registers 210 are updated based on feedback 225 from the region-based automatic exposure and gain control circuit 220. The region-based automatic exposure and gain control circuit 220 receives an input 230 from a target application that defines the region of interest based on identification of a target of interest.

Exposure and gain values are computed on the basis of pixels in a selected region of interest that carry weights with respect to one another. A histogram is constructed based on the pixels located in the region of interest, and exposure and gain values are computed based on the histogram. Not all pixels in the region of interest are required to compute the exposure and gain. Therefore, the pixels in the region of interest are sampled. For example, there are 640×480 pixels in a Video Graphic Array (VGA) image. Instead of using all of the pixels, a sampling is made of one pixel in every nth row and one pixel in every mth column, where n and m may be equal. For example, a sampling of one pixel in every 16th row and one pixel in every 16th column is taken yielding a sampling of 40×30 pixels out of the 640×480 total pixels. The dynamic range of each pixel is defined by the number of bits for each pixel signal value. For example, a dynamic range of 0-1023 would require 10 bits per pixel.

Figure 3:
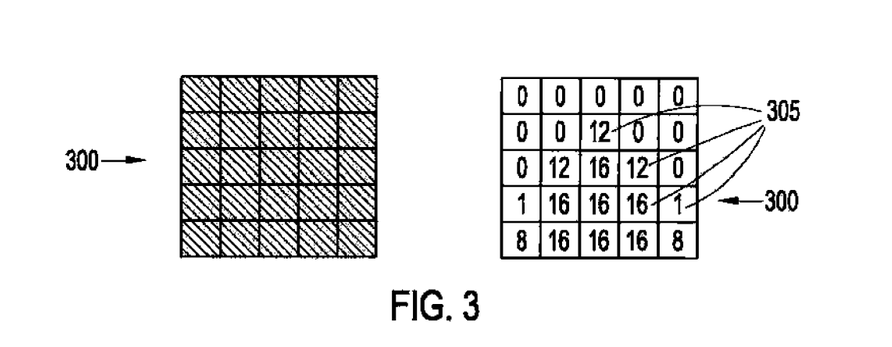
FIG. 3 is an example of an array of image tiles indicating weights assigned to tiles of an image.

FIG. 3 is an example of an array of image tiles 300 indicating weights assigned to the tiles 305 of an image. The higher the weight the more interest there is in a particular tile. The image is sub-sampled based on the tile weights and the sample described above. For example, if the weight of the tile is zero then no pixels in that tile will be included in the sub-sample. If the tile has a weight of sixteen, however, then 16 pixels from that tile are included in the sub-sample. Similarly, for other tile weights up to the nth sample in a row and the mth sample in a column, the pixels of the sample are sub-sampled. That is, the sub-sample will contain no more samples than the sampling defined by n and m and discussed above. The sub-sampling based on tile weight allows a concentration or focusing on the object of interest contained in the region of interest.

A histogram representing bin numbers vs. pixel count is constructed for every image. A bin is an aggregation of frequencies. In order to decrease the settling/lag time, the count need not be based on the entire dynamic range but is instead based, for example, on the six most significant bits of a ten bit readout register. The look of the histogram is different based on the bin width. The larger the bin width the coarser the histogram. The narrower the bin width, the closer the histogram will approximate a frequency distribution. It is not unreasonable to set the bin width in the neighborhood of sixteen. Further, the size of each bin need not be the maximum possible of 40×30 but need only be 10% or 120. This is based on using a 90th percentile to determine the bin number that is required to accumulate a count of 120.

Figure 4:
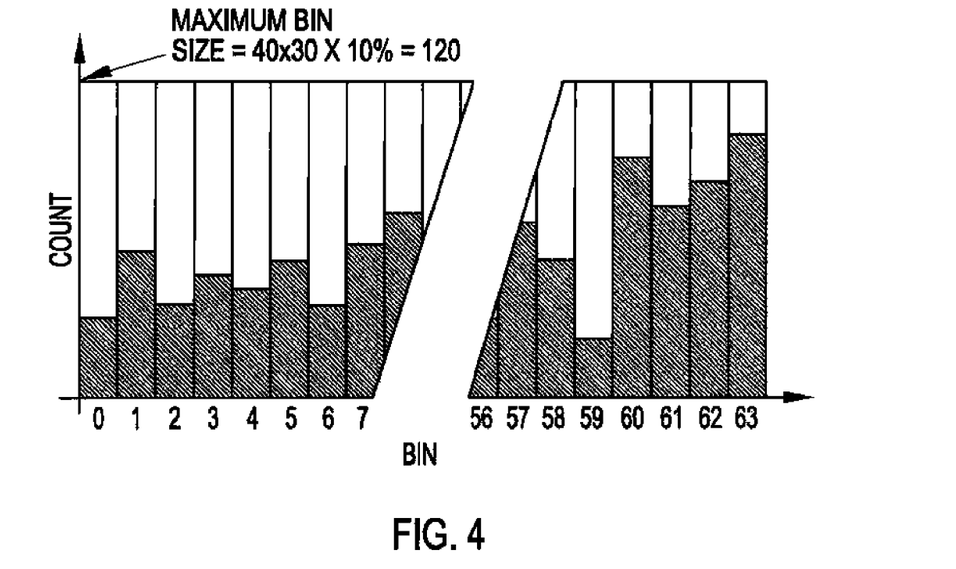
FIG. 4 is an example of a histogram built in accordance with the present invention.

FIG. 4 is an example of an histogram built in accordance with the present invention. The histogram of FIG. 4 uses the six most significant bits of the dynamic range of each pixel signal value in the sub-sample. Bin number 63 has the count of the number of pixels that are the lightest/brightest. Bin number 0 has the count of the number of pixels that are the darkest.

Figure 5:
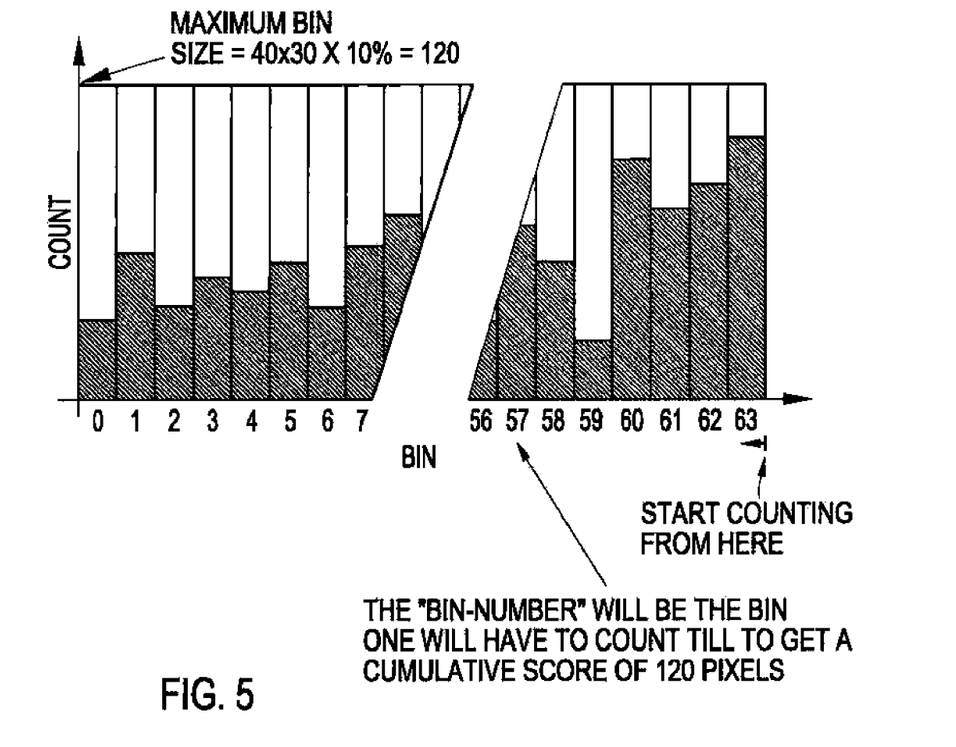
FIG. 5 is an example of a histogram used to accumulate a score/count at a target percentile in accordance with the present invention.

FIG. 5 is an example of a histogram used to accumulate a score/count at a target percentile. Based on using a 90th percentile and staring at bin number 63, the counts from each bin are accumulated until a count of 120 has been reached.

There are two main procedures performed by the invention—automatic exposure control and automatic gain control. There is an overriding procedure that controls which of the procedures is static and which is operational/activated at any given time. Automatic exposure control takes precedence over automatic gain control. When automatic exposure control is activated, automatic gain control is set at one (unity) implying no gain or attenuation. If light conditions are very bright, then the exposure is automatically reduced accordingly. If light conditions are very dark then the exposure is automatically increased accordingly. It is only when the exposure reaches a limit (minimum or maximum) that automatic gain control is activated. The gain values range from $$\frac{1}{16} \text{ to } 15\frac{15}{16}$$

with a preferred gain value in the range of $$\frac{15}{16} \text{ to } \frac{17}{16}.$$

Figure 6A:
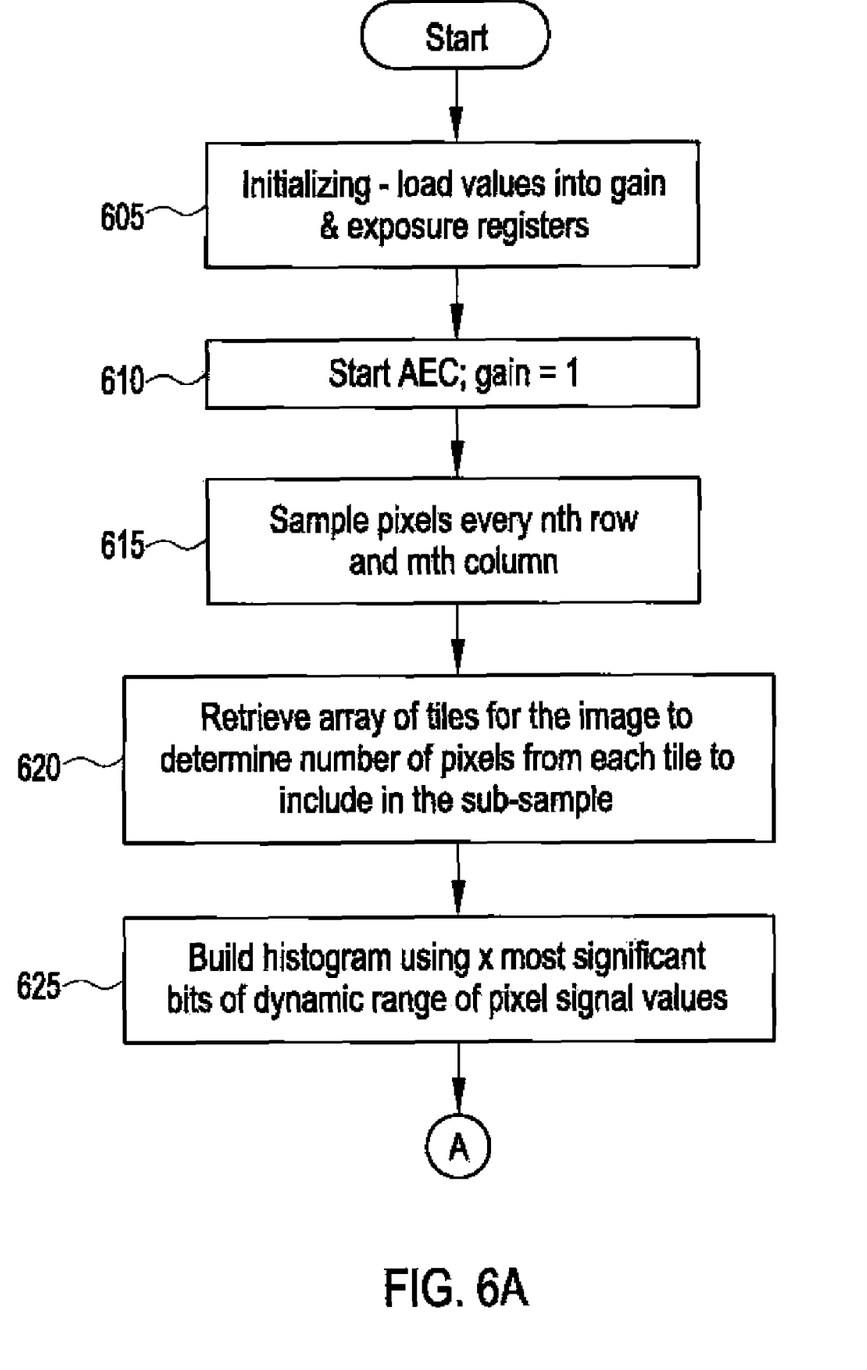
FIG. 6A-E are flowcharts illustrating the method of performing automatic exposure and gain control in accordance with the present invention.
Figure 6B:
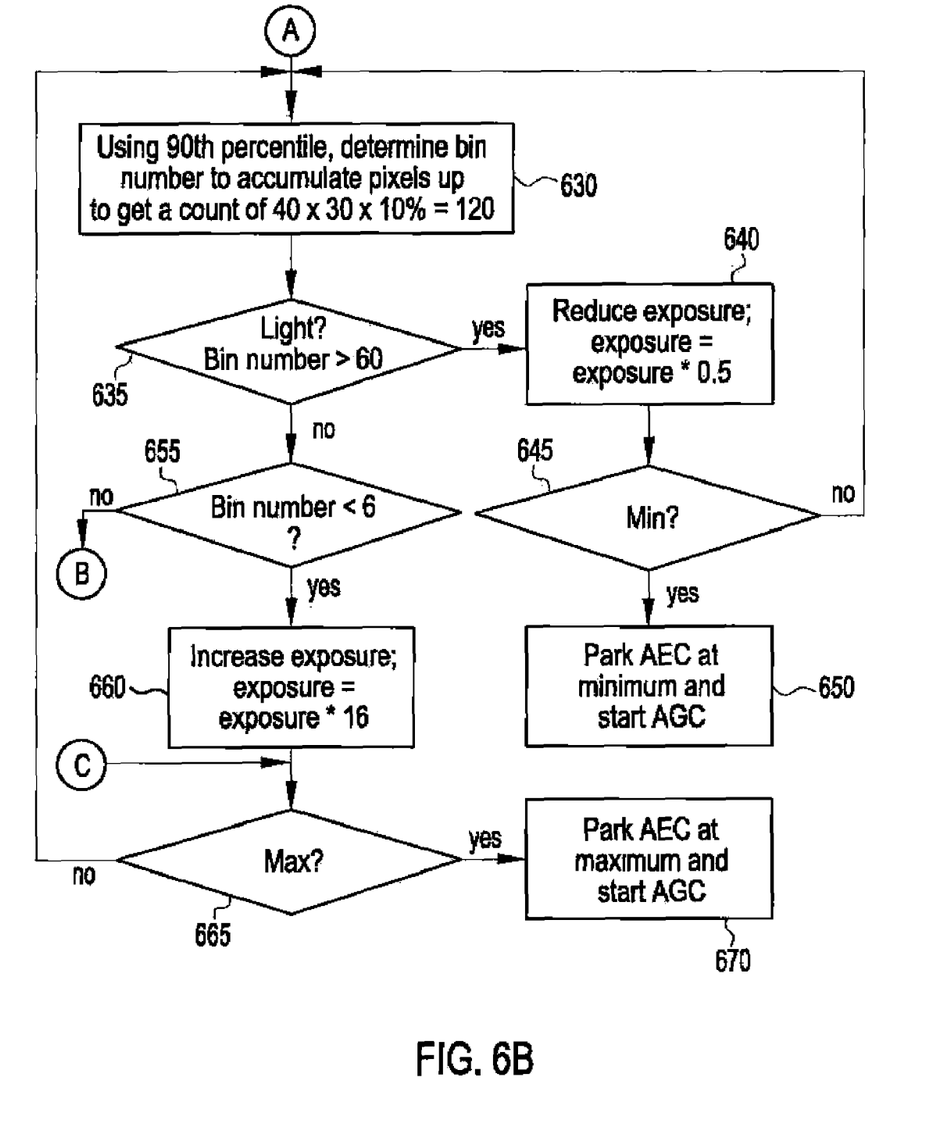
Figure 6C:
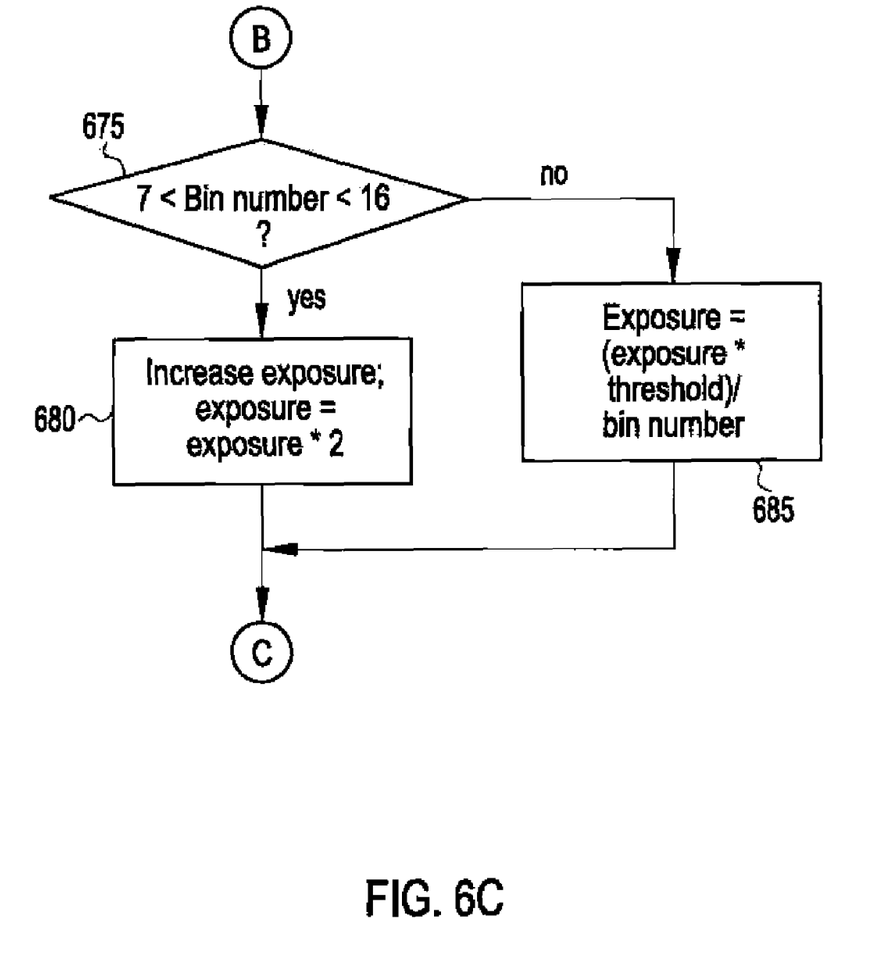
Figure 6D:
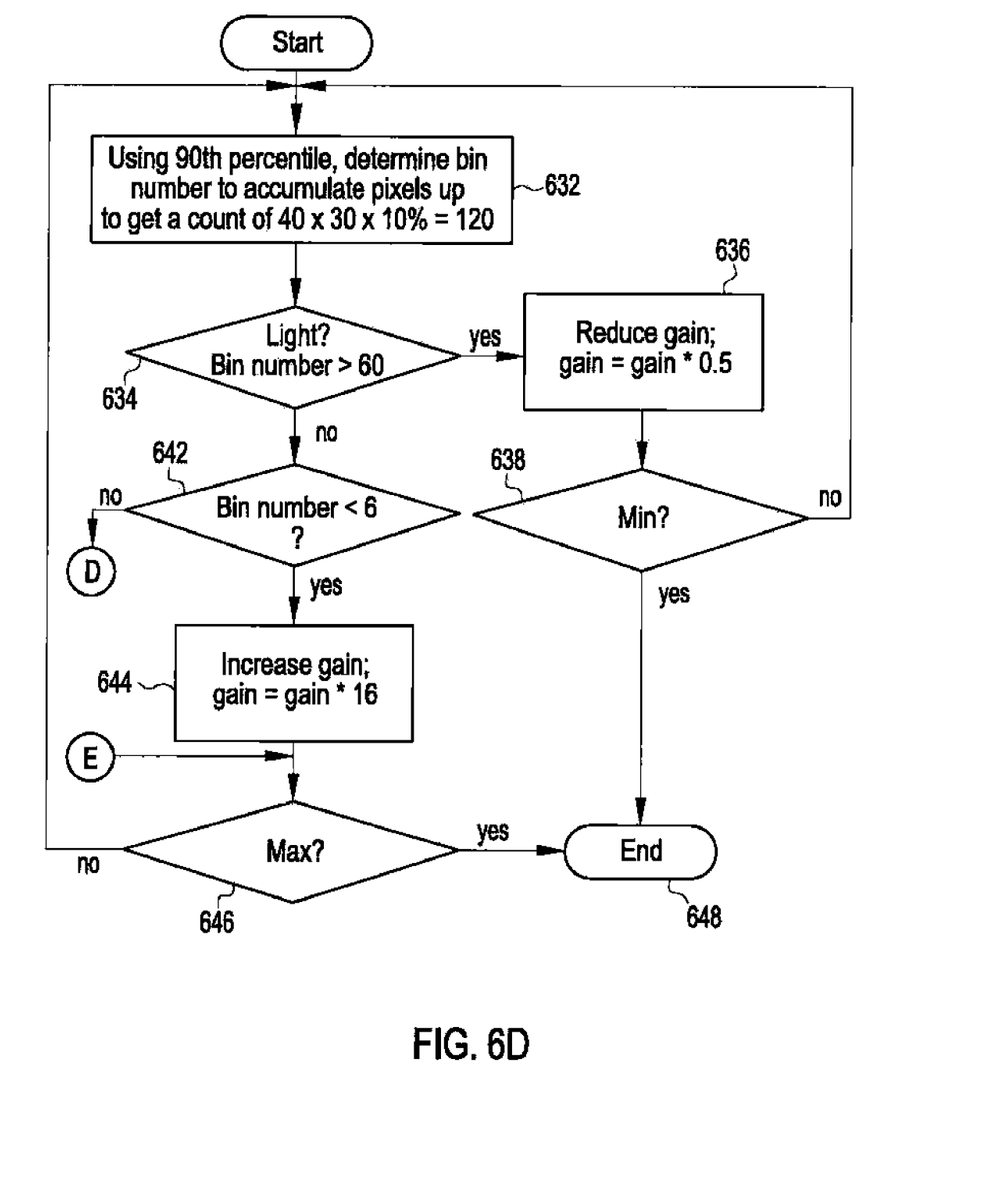
Figure 6E:
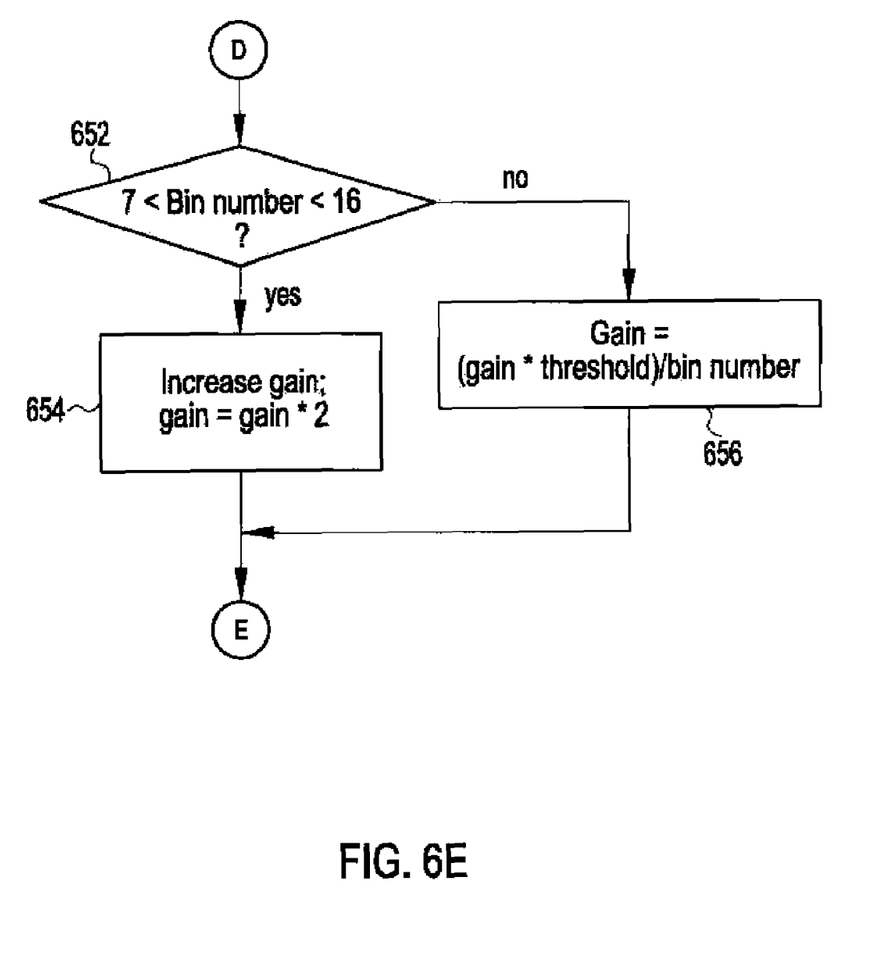

FIG. 6A-E are flowcharts illustrating the method of performing automatic exposure and gain control in accordance with an embodiment of the present invention. FIG. 6B is a continuation of FIG. 6A. FIG. 6C is a continuation of FIG. 6B. FIG. 6D illustrates the automatic gain control method and FIG. 6E is a continuation of FIG. 6D.

The method begins at step 605 by initializing the analog exposure and gain control registers. The gain is set to one and the automatic exposure control method is activated at step 610. The pixels of the image are sampled at every nth row and every mth column at step 615, where n and m may be equal. The array of weighted tiles for the image is retrieved at step 620 to determine the number of pixels from each tile to include in the sub-sample. The histogram is constructed at step 625 using the x most significant bits of the dynamic range of pixel signal values. For example, using the six most significant bits means that the 4 least significant bits are unused. This is equivalent to division by 16.

Referring now to FIG. 6B, the bin number to accumulate 10% of the pixels is determined at step 630. For example, using 90th percentile, a count of 120 pixels would be required. Using 95th percentile, a count of 60 pixels would be required. The bin number determined in step 630 is compared to bin number 60 at step 635. If the bin number is greater than bin number 60, then the exposure is reduced by multiplying the current exposure by 0.5 at step 640. The exposure is tested at step 645 and if the exposure has not reached a minimum limit at this point, then the bin number is recomputed using a selected percentile at step 630. If, at step 645, the exposure has reached a minimum, the automatic exposure control method is deactivated (made static/parked) and the automatic gain control method is activated at step 650. The automatic gain control method is shown in FIGS. 6D and 6E.

If, at step 635, the bin number is less than or equal to 60, then the bin number is compared to bin number 6 at step 655. If the bin number is less than 6, then the exposure is increased by multiplying the current exposure by 16 at step 660. The exposure is tested at step 665 and if the exposure has not reached a maximum limit at this point, then the bin number is recomputed at step 630 using a selected percentile. If, at step 665, the exposure has reached a maximum, then the automatic exposure control method is deactivated (made static/parked) and the automatic gain control method is activated at step 670.

Referring now to FIG. 6C, the bin number determined in step 630 is compared to bin numbers 7 and 16 at step 675. If, at step 675, the bin number is greater than bin number 7 and less than bin number 16, then at step 680 the exposure is increased by multiplying the current exposure by 2. If, at step 675, the bin number is greater than or equal to 16, then the exposure is adjusted by multiplying the current exposure by the threshold (or target bin number, for example bin number 50) and dividing by the current bin number. The method continues at step 665 (described above with respect to FIG. 6B).

Referring to FIG. 6D, the bin number to accumulate 10% of the pixels is determined at step 632. For example, using 90th percentile, a count of 120 pixels would be required. Using 95th percentile, a count of 60 pixels would be required. The bin number determined in step 632 is compared to bin number 60 at step 634. If the bin number is greater than bin number 60, then the gain is reduced by multiplying the current gain by 0.5 at step 636. The gain is tested at step 638 and, if the gain has not reached a minimum limit at this point, the bin number is recomputed at step 632 using a selected percentile. If the gain has reached a minimum (step 638), then the automatic gain control method is deactivated (made static/parked) and process is stopped at step 648. The automatic exposure control method is shown in FIGS. 6B and 6C.

If, at step 634, the bin number is less than or equal to 60, then the bin number is compared to bin number 6 at step 642. If the bin number is less than 6 then the exposure is increased by multiplying the current exposure by 16 at step 644. The gain is tested at step 646, and if the gain has not reached a maximum limit at this point, the bin number is recomputed at step 632 using a selected percentile. If the gain has reached a maximum then the automatic gain control method is deactivated (made static/parked) and the process is stopped at step 648. The process is stopped at step 648 because the automatic exposure control method has already been executed. The automatic exposure control method is shown in FIGS. 6B and 6C.

Referring now to FIG. 6E, the bin number determined in step 632 is compared to bin numbers 7 and 16 at step 652. If the bin number is greater than bin number 7 and less than bin number 16, then at step 654 the gain is increased by multiplying the current exposure by 2 at step 680. If the bin number is greater than or equal to 16, then the gain is adjusted at step 656 by multiplying the current gain by the threshold (or target bin number, for example bin number 50) and dividing by the current bin number. The method continues at step 646 (described above with respect to FIG. 6D).

Figure 7A:
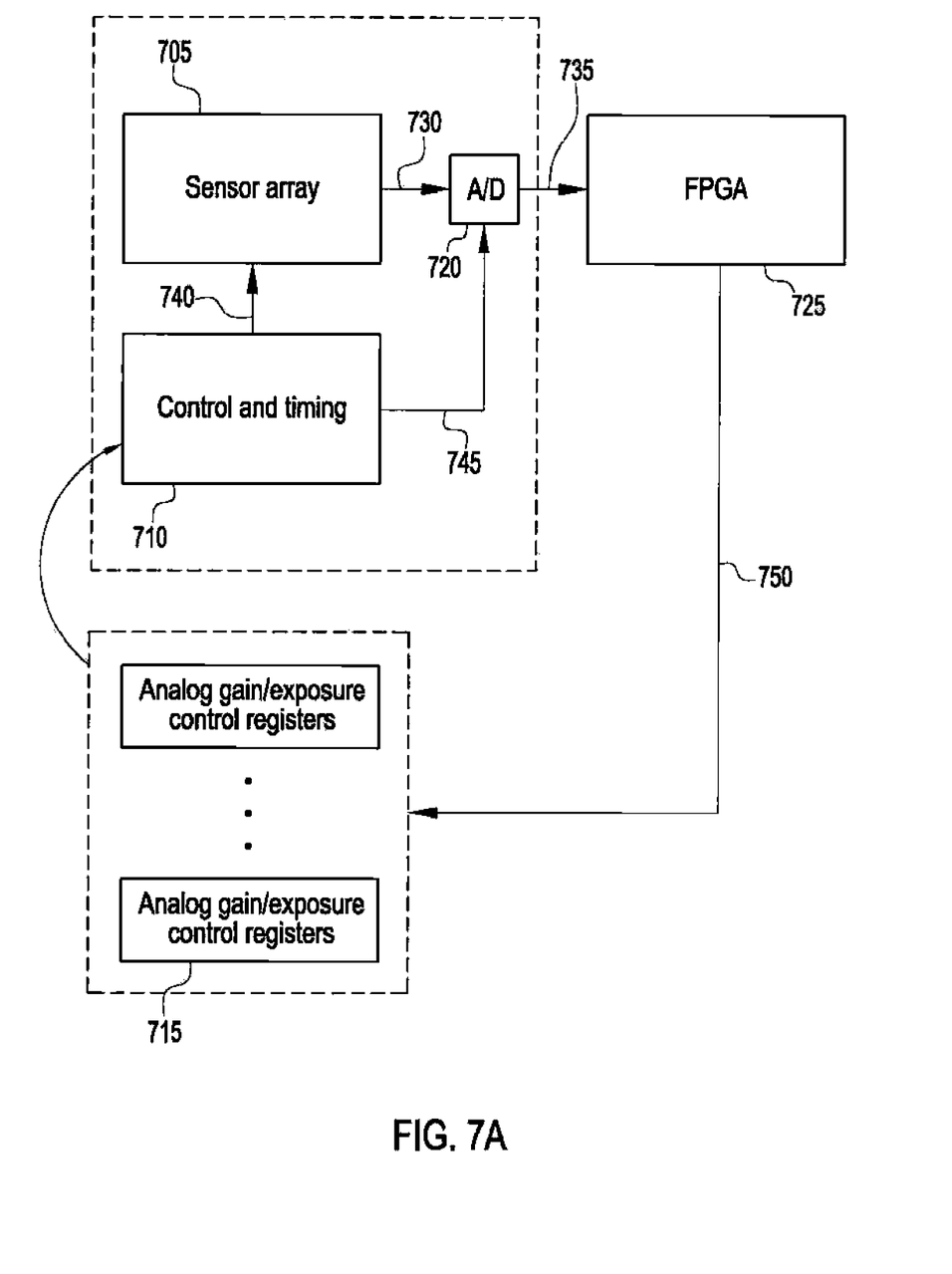
FIG. 7A is a block diagram of the automatic exposure and gain control circuit of the present invention.

FIG. 7A is a block diagram of the automatic exposure and gain control circuit of the present invention. A sensor array 705 is an array of pixels used to capture an image. The sensor array 705 is coupled to a timing and control circuit 710 having analog exposure and gain control registers 715. The sensor array 705 receives an input 740 from the timing and control circuit 710 indicating an exposure control value, which is applied to the transistor gates of the pixels of the array to control how long the pixel accumulates charge. The exposure control value is applied to all pixels of the array if the sensor array uses a global shutter and to particular rows of the array if the sensor uses a rolling shutter. The analog-to-digital (A/D) converter 720 receives an input 745 from the timing and control circuit 710 indicating a gain control value, which is, for example, in the range of $$\frac{1}{16} \text{ to } 15\frac{15}{16}.$$

The A/D converter 720 applies the gain control value to the analog pixel signal values 730 it receives from sensor array 705 and outputs digital pixel signal values to the automatic exposure control and automatic gain control circuit 725. One implementation of the automatic exposure control and automatic gain control circuit uses a Field Programmable Gate Array (FPGA). The automatic exposure control and automatic gain control circuit calculates exposure control and gain control adjustment values 750, which are applied to adjust values in the analog exposure control and gain control registers 715.

Figure 7B:
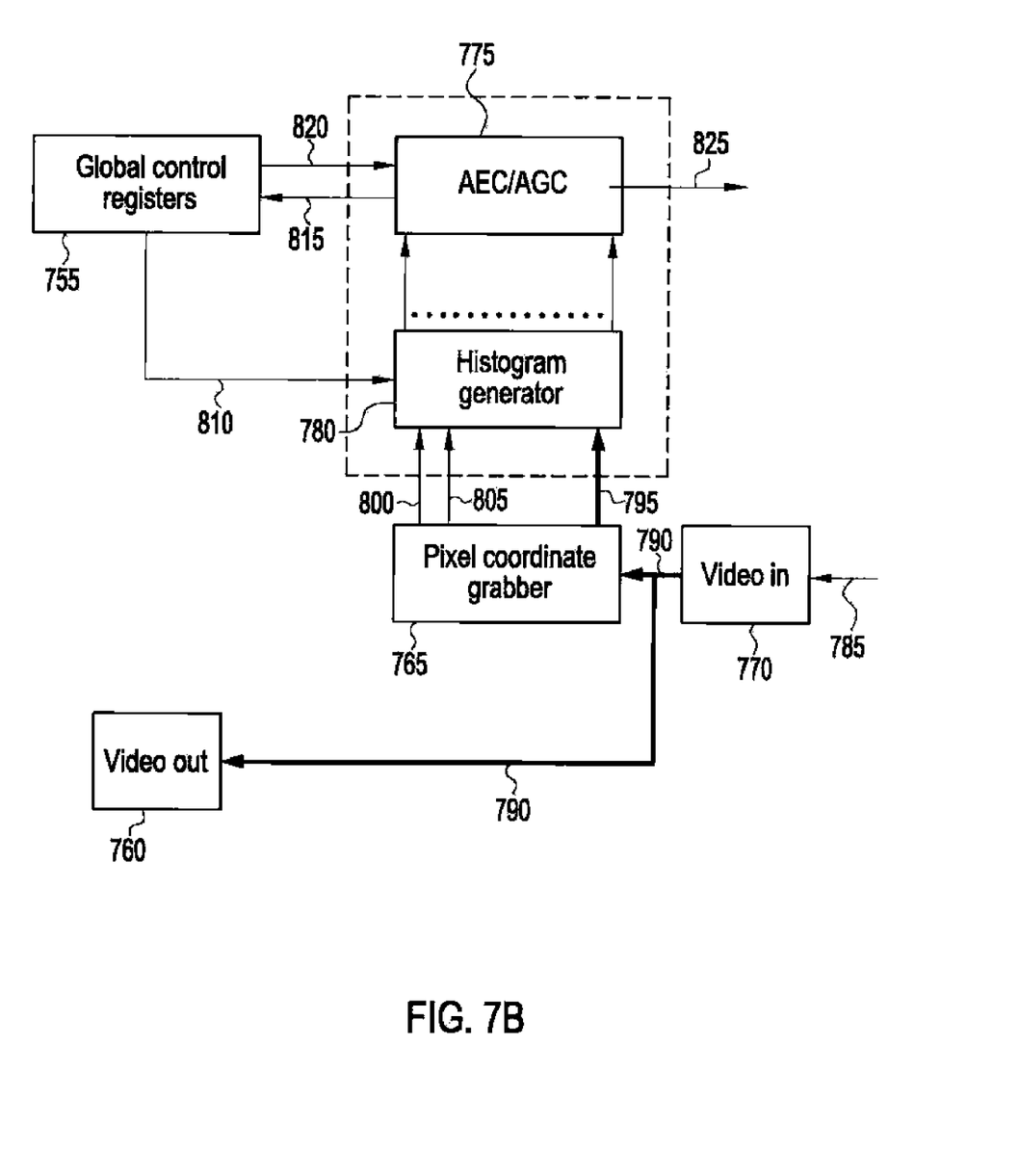
FIG. 7B is a block diagram of a portion of the automatic exposure and gain control circuit of FIG. 7A.

FIG. 7B is a block diagram of the automatic exposure and gain control circuit 725 of FIG. 7A. The digital signal values are input to the automatic exposure and gain control circuit 725 via a data stream 785 via a video in module 770. The data stream 790 of digital signal values is forwarded to the pixel coordinate grabber 765 and the video out module 760. The video out module 760 gets the data stream of digital signal values out of the automatic exposure and gain control circuit 725. That is, while the data stream is used to provide an adjustment to the analog exposure and gain control registers, that adjustment has approximately a one frame lag or settling time while the automatic exposure control and automatic gain control circuit 725 is active. The data stream for the current frame is thus output directly to the video out module 760, the data stream for the current frame having been captured using the automatic exposure control and automatic gain control adjustments calculated during the last frame. The data stream may be progressive or interlaced depending on the scan mode. An interlaced data stream starts with, for example, line 1 and then takes line 3 and continues in this manner until data has been obtained for the image and then goes back to take data for the even lines in this way collecting data for the entire image. A progressive data stream starts from the top at the left end and scans to the right and then starts on the next line and performs the same operation for that line until all data for an image has been collected.

The pixel coordinate grabber 765 translates the data stream 790 of digital signal values to x-y coordinates 800, 805 using the horizontal and vertical sync signals. The x-y coordinates 800, 805 as well as a data stream 795 of digital signal values is forwarded to histogram generator 780. The histogram generator 780 generates a histogram of, for example, 63 bins, each bin being 120 deep. The histogram is used in conjunction with the AEC/AGC module 775 to determine an adjustment for each the exposure and the gain to be applied to analog exposure and gain control registers, which in turn apply the values to the transistors of pixels of the sensor array to control the duration of charge accumulation. The AEC/AGC control module 775 controls whether exposure or gain is adjusted based on exposure adjustment taking priority over gain adjustment. The global control registers 755 define the coordinates of the tiles of the image and assign weights to the tiles for sub-sampling as described above. The grid coordinates of the tiles of the image are programmable. The global control registers 755 interface with the AEC/AGC module 775 supplying the grid coordinates of the tiles of the image and the weights of the tiles of the image via an input 820. The AEC/AGC module 775 supplies feedback to the global control registers to adjust the size of the tiles and the weight via an output 815. The global control registers 755 also supply the grid coordinates of the tiles and the weights of the tiles to the histogram generator 780. The output of the AEC/AGC module 775 goes to the analog exposure and gain control registers of the timing and control circuit of the sensor array to provide an adjustment to the analog exposure and gain control registers.

Figure 8:
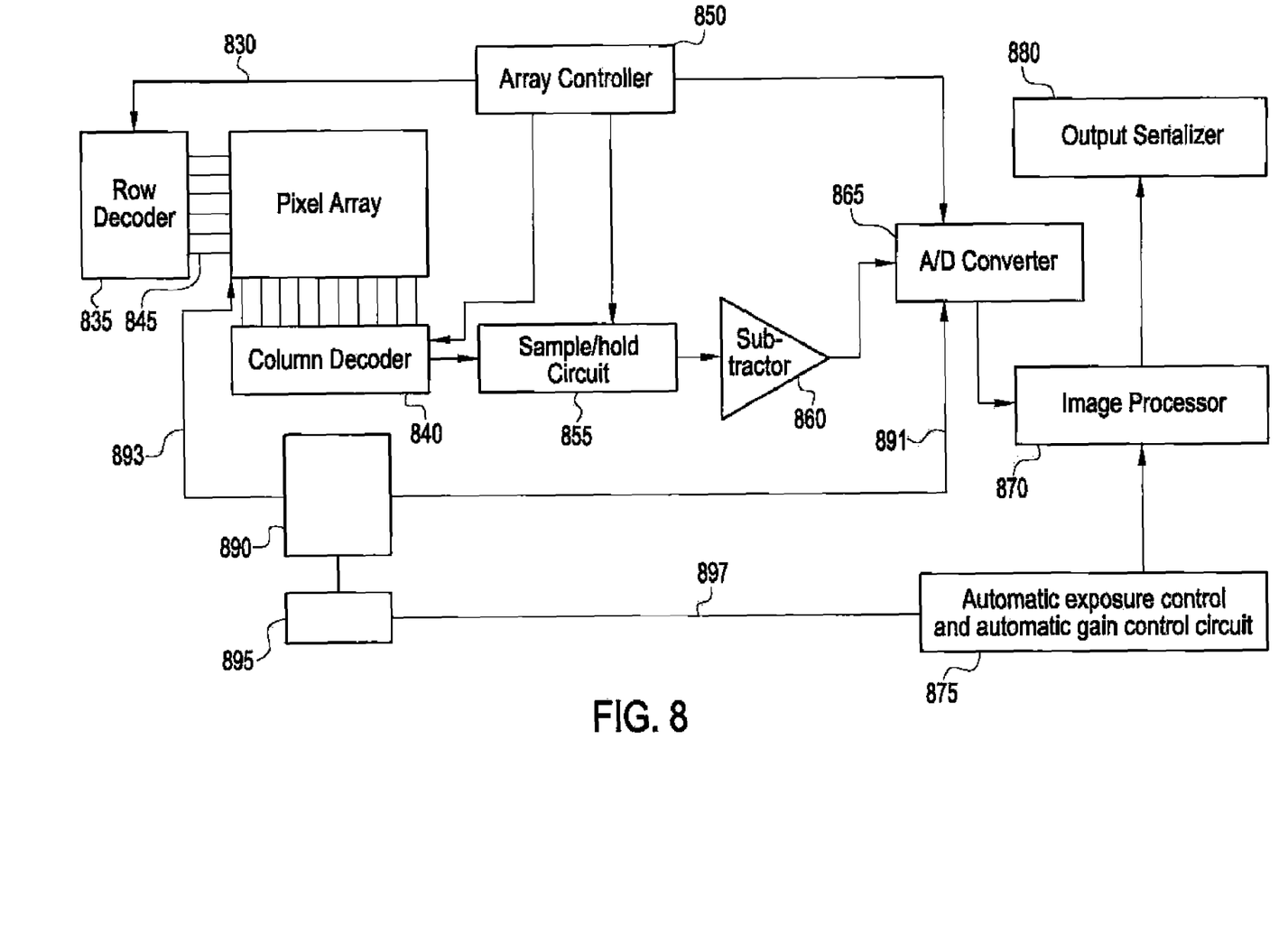
FIG. 8 is a block diagram of an exemplary digital camera system having a dark current and defective pixel compensation circuit of the present invention.

FIG. 8 is an exemplary embodiment of a portion of a digital camera system 830, which employs an image processor 870 and has an automatic exposure control and automatic gain control circuit 875 in accordance with the present invention. The illustrated components could be integrated together in one integrated circuit or could be implemented with discrete components. A row decoder 835 and column decoder 840 are coupled to a pixel array 845 and are used to select a pixel in the pixel array 845. Each pixel outputs a pixel reset signal $V_{rst}$ and a pixel image signal $V_{sig}$. An array controller 850 is coupled to the row decoder 835 and column decoder 840 and determines which row and column are activated to produce the $V_{rst}$ and $V_{sig}$ signals. The sample/hold circuit 855 sequentially receives the pixel signals from the column lines through the column decoder 840 selection circuit. The sample/hold circuit 855 provides the $V_{rst}$ and $V_{sig}$ pixel signals to subtractor 860, which subtracts the signals. The analog-to-digital (A/D) converter 865 accepts the signal from subtractor 860 and outputs digital signals representing the subtracted $V_{rst}$ and $V_{sig}$ pixel signals to the image processor 870. The image processor 870 is also coupled to the automatic exposure control and automatic gain control circuit 875 and output serializer 880. The automatic exposure control and automatic gain control circuit 875 is further coupled to analog exposure control and gain control registers 895, which are, in turn, coupled to a timing and control circuit 890 of the sensor array 845. The automatic exposure control and automatic gain control circuit 875 provides an adjustment to the analog exposure control and gain control registers via an output 897. The timing and control circuit 890 controls the gain with a gain control signal 891 applied to the analog-to-digital converter 865. The timing and control circuit 890 controls the exposure with an exposure control signal 893 applied to the pixel array 845.

The exemplary image signal processing methods and apparatus described above may be implemented in software, hardware, firmware, application specific integrated circuits (ASICs), field programmable gate arrays (FPGAs) or any combinations of the above or their equivalent.

Figure 9:
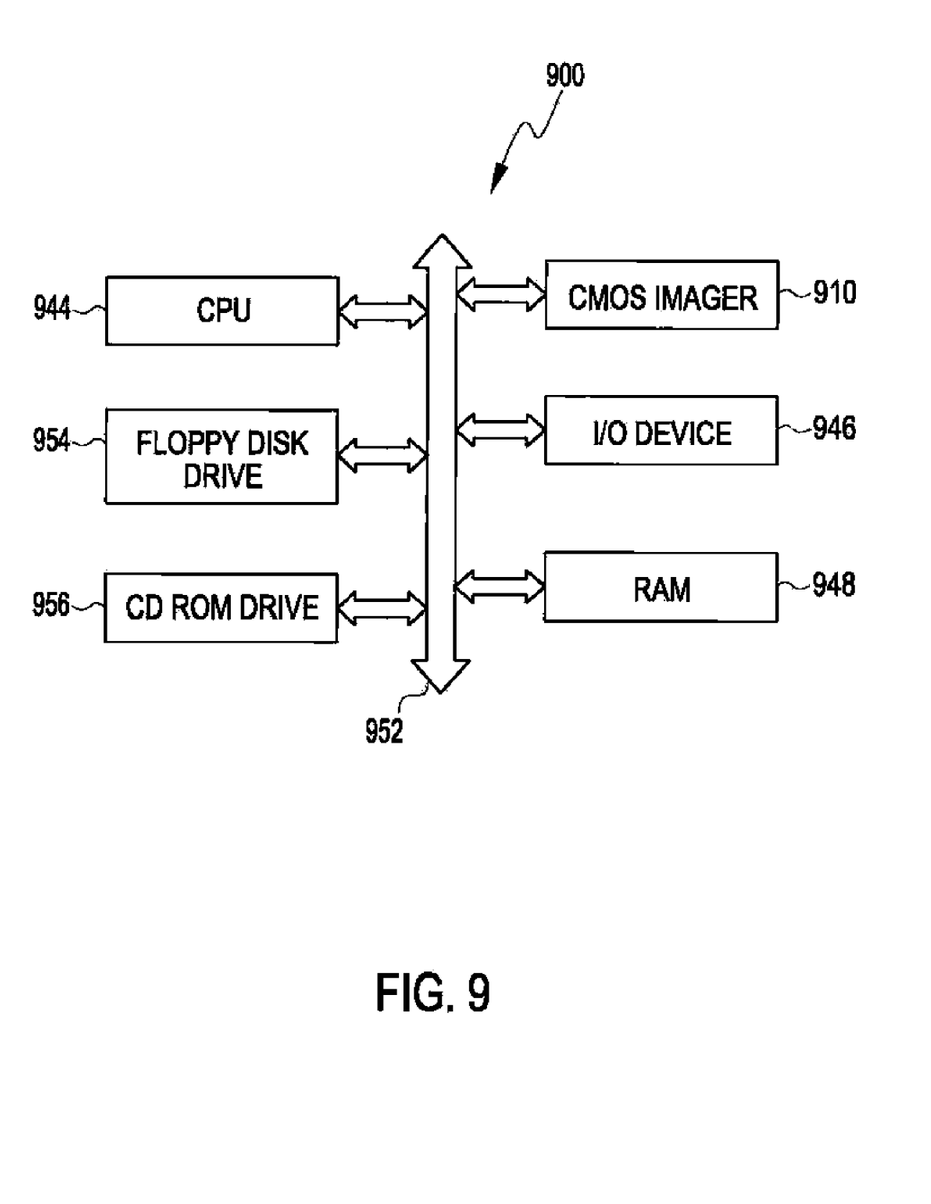
FIG. 9 is a block diagram of a computer system utilizing an imager having a automatic exposure and gain control circuit of the present invention.

A typical processor based system 900 that includes a CMOS imager device 910 according to the present invention is illustrated generally in FIG. 9. A processor based system 900 is exemplary of a system having digital circuits that could include CMOS imager device 910 the details of which are described above with reference to FIGS. 1 through 8.

A processor system 900, such as a computer system, for example, generally comprises a central processing unit (CPU) 944 that communicates with an input/output (I/O) device 946 over a bus 952. The CMOS imager 910 also communicates with the system over bus 952. The computer system 900 also includes random access memory (RAM) 948, and, in the case of a computer system may include peripheral devices such as a floppy disk drive 954 and a compact disk (CD) ROM drive 956 which also communicate with CPU 944 over the bus 952. Software could be stored on a floppy disk drive 954 or an a CD-ROM drive 956 for execution on, for example, image processor 870 (FIG. 8).

It should again be noted that although the invention has been described with specific reference to CMOS imaging devices, the invention has broader applicability and may be used in any imaging apparatus. The above description and drawings illustrate preferred embodiments of the present invention. It is not intended that the present invention be limited to the illustrated embodiments. Any modification of the present invention that comes within the spirit and scope of the following claims should be considered part of the present invention.

What is claimed as new and desired to be protected by Letters Patent of the United States is:

1. An automatic exposure control and automatic gain control circuit, comprising:
   a translation module for transforming an input data stream into x-y coordinates corresponding to said input data stream, wherein the x-y coordinates define a plurality of tiles corresponding to respective portions of a digital image;
   global control registers for storing the x-y coordinates and weights associated with said tiles; and
   a module for adjusting the x-y coordinates such that the tiles are concentrated in a region of interest in the digital image and for generating and using a histogram based on said x-y coordinates, said tiles, and said assigned tile weights, said module using said histogram to provide an adjustment to exposure and gain control registers.

2. The automatic exposure control and automatic gain control circuit according to claim 1, wherein said input data stream comprises digital signal values from an analog-to-digital converter of a sensor array.

3. The automatic exposure control and automatic gain control circuit according to claim 1, further comprising a video input module for receiving said input data stream and forwarding said input data stream to said translation module.

4. The automatic exposure control and automatic gain control circuit according to claim 1, wherein said module for generating and using said histogram further comprises:
   a histogram generator receiving said input data stream, said x-y coordinates, said tiles, and said assigned tile weight; and
   a control module providing said adjustment to said analog exposure control and analog gain control registers, said control module using said histogram created by said histogram generator, said tiles and said assigned tile weights to calculate said adjustment.

5. A method for capturing a digital image of a scene, the method comprising:
   sensing incident light to generate digital pixel values that collectively form the digital image of the scene;
   defining a plurality of tiles corresponding to portions of the digital image;
   adjusting dimensions of at least some of the tiles based on a region of interest in the scene;
   assigning a weight to each tile;
   selecting a sample of digital pixel values associated with each tile based on the weight assigned to the tile; and
   adjusting an exposure setting based on the sample of digital pixel values.

6. The method of claim 5, wherein adjusting the tiles comprises resizing at least some of the tiles to increase the number of tiles in the region of interest.

7. The method of claim 6, wherein the resizing comprises making tiles smaller inside the region of interest and making tiles larger outside the region of interest.

8. The method of claim 6, wherein the number of tiles after the resizing step equals the number of tiles before the resizing step.

9. The method of claim 5, wherein the selecting step comprises:
   selecting a set of digital pixel values associated with each tile without regard to the weight assigned to the tile; and
   selecting a subset of the set of digital pixel values associated with each tile based on the weight assigned to the tile.

10. The method of claim 9, wherein the selecting a set of digital pixel values comprises selecting every nth digital pixel value.

11. The method of claim 10, wherein n=16.

12. The method of claim 9, wherein the selecting a subset of the set of digital pixel values comprises selecting a number of digital pixel values proportional to the weight assigned to a respective tile.

13. The method of claim 12, wherein the selecting a subset of the set of digital pixel values comprises selecting a number of digital pixel values equal to the weight assigned to a respective tile.

14. The method of claim 5, further comprising:
if the exposure setting is at a limit, adjusting an analog gain setting.

15. A processor system, comprising:
an input device configured to receive pixel values; and
a processor configured to:
  receive pixel values from the input device, wherein the pixel values correspond to an image of a scene;
  adjust boundaries of tiles based on an area of interest within the image,
  wherein each tile defines set of pixel values within a portion of the image;
  select a subset of pixel values within each tile based on a weight assigned to the tile;
  generate a histogram based on the selected subset of pixel values; and
  determine an adjusted image parameter based on the histogram.

16. The processor system of claim 15, wherein each tile defines a rectangular area of the image.

17. The processor system of claim 15, wherein the processor is further configured to adjust boundaries of the tiles by changing (x, y) coordinates defining corners of the tiles.

18. The processor system of claim 17, wherein each (x, y) coordinate corresponds to a pixel location within the image.

19. The processor system of claim 15, wherein the adjusted image parameter is an exposure parameter.

20. The processor system of claim 15, wherein the adjusted image parameter is a gain parameter.

21. The processor system of claim 19, wherein the processor is further configured to determine the exposure parameter by:
  if at least a threshold number of the selected pixel values exceed a brightness threshold:
    determine that the exposure parameter should be reduced; or
  if at least a threshold number of the selected pixel values are below a darkness threshold;
    determine that the exposure parameter should be increased.

22. The processor system of claim 21, wherein the processor is further configured to determine a gain parameter by:
  if at least a threshold number of the selected pixel values exceed a brightness threshold and the exposure parameter is at a minimum:
    determine that the gain parameter should be reduced; or
  if at least a threshold number of the selected pixel values are below a darkness threshold and the exposure parameter is at a maximum:
    determine that the gain parameter should be increased.

23. The processor system of claim 20, wherein the processor is further configured to determine the gain parameter by:
  if at least a threshold number of the selected pixel values exceed a brightness threshold:
    determine that the gain parameter should be reduced; or
  if at least a threshold number of the selected pixel values are below a darkness threshold:
    determine that the gain parameter should be increased.

* * * * *